(12) United States Patent
Salvatore

(10) Patent No.: US 9,404,566 B2
(45) Date of Patent: Aug. 2, 2016

(54) POWER MEASUREMENT SYSTEM BASED ON SELF-LIMITING FORCE

(71) Applicant: Randal Anthony Salvatore, Cupertino, CA (US)

(72) Inventor: Randal Anthony Salvatore, Cupertino, CA (US)

(73) Assignee: Randal Salvatore, Cupertino, CA (US)

(*) Notice: Subject to any disclaimer, the term of this patent is extended or adjusted under 35 U.S.C. 154(b) by 0 days.

(21) Appl. No.: 14/473,237

(22) Filed: Aug. 29, 2014

(65) Prior Publication Data

US 2015/0059495 A1  Mar. 5, 2015

Related U.S. Application Data

(60) Provisional application No. 61/874,318, filed on Sep. 5, 2013.

(51) Int. Cl.
| | |
|---|---|
| G01L 1/04 | (2006.01) |
| F16H 57/01 | (2012.01) |
| G01L 5/04 | (2006.01) |
| G01L 5/10 | (2006.01) |
| F16H 7/18 | (2006.01) |

(52) U.S. Cl.
CPC F16H 57/01 (2013.01); G01L 1/04 (2013.01); G01L 5/045 (2013.01); G01L 5/102 (2013.01); F16H 2007/185 (2013.01)

(58) Field of Classification Search
CPC ......... G01L 1/20; G01L 1/2287; G01L 5/047; G01L 5/102; D07B 1/145; G08C 15/12
USPC ............... 73/828, 862.451–862.453
See application file for complete search history.

(56) References Cited

U.S. PATENT DOCUMENTS

| | | | | |
|---|---|---|---|---|
| 3,722,268 A * | 3/1973 | Crooke | ..................... | G01L 5/04 33/720 |
| 4,018,085 A * | 4/1977 | Alley, Jr. | ................... | G01L 1/06 73/787 |
| 4,138,118 A * | 2/1979 | Budney | .............. | A63B 24/0006 473/202 |
| 5,079,535 A * | 1/1992 | Neuman | .............. | A61B 5/1135 338/2 |
| 2003/0197094 A1* | 10/2003 | Preston | .................. | B64D 21/00 244/142 |
| 2004/0251056 A1* | 12/2004 | McCauley | ........... | G01G 23/005 177/1 |
| 2005/0072347 A1* | 4/2005 | Niebur | .................... | B63B 21/50 114/293 |
| 2007/0056386 A1* | 3/2007 | Kohno | .................... | G01L 5/102 73/828 |
| 2008/0214344 A1* | 9/2008 | Lodge | ..................... | G01L 5/047 474/207 |
| 2009/0319203 A1* | 12/2009 | Kalliomaki | ............ | A61B 5/221 702/44 |
| 2013/0312649 A1* | 11/2013 | Tomas | .................... | B63B 21/18 114/200 |

* cited by examiner

Primary Examiner — Max Noori

(57) ABSTRACT

An apparatus is described for measuring the power expended in driving a chain. A light-weight, compact, flexible structure is attached to the chain. The tension within the chain bends the flexible structure; however, the bending of the structure itself limits the maximum amount of force applied to this flexible structure. Thus, the bending of the structure will be limited and nonlinearly dependent on the chain tension. The structure is affixed to the chain such that any up or down movement of the chain is also experienced by the structure. A sensor on this structure such as a strain gauge or an accelerometer (or both) can be used to determine the chain tension. The apparatus also has a sensor to determine the speed of the chain's movement. A microcontroller produces the resulting power data which can be stored or directly provided to the user as audio, visual, or tactile information.

20 Claims, 3 Drawing Sheets

POWER MEASUREMENT SYSTEM BASED ON SELF-LIMITING FORCE

FIELD OF THE INVENTION

The present disclosure of invention relates generally to a system for measuring the power output of vehicles possessing a chain or other elongate flexible members. The system preferably is for a bicycle and reports performance information from a bicycle to the rider with minimal distraction.

BACKGROUND

To assess one's physical capability, it is usually not sufficient to track one's time or speed alone. Wind resistance, elevation, road conditions, or weight can vary from one bicycle ride to the next. It is highly useful to be able to track power as a metric for a bicycle rider's performance. Prior art has described a means of measuring power through the use of sensors attached to a bicycle front sprocket [U.S. Pat. No. 7,047,817], attached to a bicycle hub [U.S. Pat. No. 6,418,797], attached to a chain [U.S. Pat. No. 5,167,159], and attached near a chain to measure vibrational frequency of the bicycle chain [U.S. Pat. No. 6,356,848]. Customized sprockets or hubs require significant modification to the bicycle and are currently quite costly and not suitable for economically minded bicycle riders or youths.

Devices intended to measure chain tension using additional wheels or sprockets [U.S. Pat. No. 5,167,159] have been too large and bulky to achieve widespread use. Many bicycles have <1.5 cm of clearance below the lower surface of the upper path of the bicycle chain. This does not allow sufficient space for sprockets and would severely restrict ability to access gears on most speed bicycles. Additionally, wheel- and sprocket-based devices using radii <=2.5 cm have suffered from high energy dissipation and noisy operation due to the polygon effect (an effect caused by the varying chain path-length as the chain moves around the sprocket). The invention presented in U.S. Pat. No. 5,167,159 is unsuitable because of these two problems.

The system based on measuring chain vibration [U.S. Pat. No. 6,356,848] has involved complex signal processing and has been deemed not useful when riding on surfaces that are bumpy (non-tarmac) and therefore has not been widely adopted. The system based on U.S. Pat. No. 6,356,848 has poor effectiveness because it is based on a structure that is not in direct contact with the chain but is instead some distance away from the chain. Additionally, prior disclosed bicycle power measurement systems have used visual displays to report the power to the rider. It is undesirable in many cases for a rider to take their eyes off the surrounding environment in order to monitor the power reading. It is useful for the rider to be able to get this power information through an auditory report or even tactile actuator. For these reasons, it is desirable to have a bicycle power measurement system that is cheaper and does not require any replacement or customization of existing bicycle components. It is desirable to have a system that can be implemented by attaching an additional, light-weight apparatus onto the existing bicycle and can directly measure the power expended and report information without much distraction to the rider.

For prior configurations based on strain gauge measurement, the rider is usually applying less than 300 Newton (Nt.) of force (less than 70 lbs.) to the chain for most of the riding time period. However, it is possible for riders of weight 90 kg (200 lbs.) to attain additional force and put up to 1300-1800 Nt. (300-400 lbs.) on the pedal assembly. With an additional factor of the 3-to-1 mechanical advantage of the crankshaft, a 90 kg rider can put up to 4000-5400 Nt. (900-1200 lbs.) of tension on to the chain for brief periods. This potentially large dynamic range leads to low sensitivity and accuracy for the majority of the bicycle riding period. The majority of time is spent with 300 Nt. (70 lbs.) or less. When device strain is directly proportional to chain tension, percentage error is inferior for the majority of time (for less than 300 Nt). It is beneficial if one can achieve comparable percentage error over the low- and high-force periods of the ride.

SUMMARY OF THE INVENTION

According to one aspect of the current invention, a flexible, light-weight structure is clipped onto a chain. Tension in the chain will flex the structure, however, the act of flexing the structure will protect the structure itself from further destructive force levels. This resulting protection is defined as a self-limiting force on the flexible structure. Better sensitivity in the 0-300 Nt. range can be achieved when a self-limiting strain structure is implemented. There have been many examples of structures that achieve self-limiting force, such as when a blade of grass bends over during high winds and avoids most of the force that would have been present on its original cross section or when a snail subject to a strong side force will release its hold before its body is damaged or when a pressure relief valve serves to release excessive pressure before a pressurized tank can be damaged. Each of these avoids a force that could have been destructive to a rigid system. They also avoid the heavier weight structure that would have been required to maintain rigidity during high force.

The same type of advantages in a tension monitor can also be achieved if one eliminates the requirement of proportional strain vs. chain tension. Removing this requirement leads to advantages allowing a lighter weight system, lower cost of materials, and overall higher versatility. The advantages are achieved by designing the sensor with a flexible structure which will bend a limited amount even when a significant force is applied. The nonlinear response of the strain due to the tension can be calibrated out through the use of microcontroller computation: a saturating or compressed response signal can be decompressed by the electronic microcontroller. The flexible sensor must be able to repeatedly recover its original shape. Thus, there can be no plastic deformation in the flexing system. It must operate in the regime of elastic deformation. For this reason, flexible materials with low mechanical creep and high elastic limit are used in the flexible region of the structure. The flexible structure should be capable of purely elastic movement throughout the operating strain range.

Because wheels or sprockets with small radii of curvature lead to undesirable polygon effect issues, radii of curvature greater than 2 cm should be used. However, a lower wheel or sprocket with radii of curvature greater than 2 cm leads to excessive size that does not easily fit in a compact space allowed on a bicycle's chain, especially not well on a multi-speed bicycle. Due to the polygon effect, a smooth sliding surface with radii larger than 2 cm is preferred. Low coefficient of friction surfaces are used with high wear resistance. It is desirable to cast the structure or machine the annealed structure and then to heat treat the material to achieve a structure with high range of elastic strain and high wear resistance.

The apparatus is intended to measure the force in the chain. This can be accomplished in a variety of ways. A sensor such as an accelerometer attached to flexible structure can be used to sense the acceleration from vibration of the flexible structure on the chain. The signal from this accelerometer can allow tension in the chain to be calculated. Another way to determine chain tension is to attach a strain gauge to the flexible structure. The gauge needs to be able to measure the strain of the flexible structure repeatedly and repeatably. However, the measurement of strain on the flexible structure should not be directly averaged over long periods of time (not longer than 0.5 sec) because the strain on the flexible structure is nonlinearly dependent on the chain tension. Averaging periods of high strain and low strain on the flexible structure would skew (underestimate) the true average chain tension. Aside from the elastic bending, there are no visible moving parts within the apparatus. Indeed, the chain moves longitudinally along the flexible structure, but the flexible structure does not move longitudinally relative to the bicycle frame. The flexible structure is preferably tethered to the bicycle frame or to another part which is attached to the bicycle frame, such as the front derailleur. The top path of the chain is the stressed part of the chain during pedaling, therefore the flexible structure is installed on the top path of the chain and not on the low-tension bottom return path of the chain.

Also attached to the flexible structure is a sensor for measuring the chain speed. Preferably a light emitting diode (LED) and photodetector are affixed to the flexible structure or a magnetic detector is affixed to the flexible structure to sense the longitudinal movement of chain rollers (due to periodic variation in reflected light or inductance while the chain is moving), without any of the optical or magnetic components making direct contact with the chain itself.

DRAWINGS

DETAILED DESCRIPTION AND OPERATION

Figure 1:
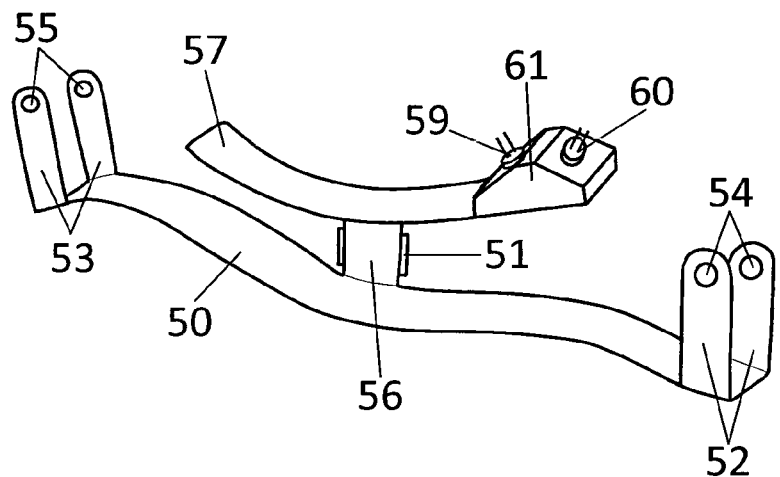
FIG. 1 is a perspective view on of the self-limiting flexible structure assembly.

The following description is directed to the invention, but the appended claims are not so limited. FIG. 1 shows an example of the flexible structure 50 with an accelerometer sensor 51. The accelerometer may be connected electrically by wires, but that is not shown here since it is considered common knowledge. The single, integral piece of metal has two front side posts 52 (seen at right side of FIG. 1) and two back side posts 53 (left side of FIG. 1). The side posts are on each side of the chain and serve as a guide or alignment of the assembly on the chain. The front side posts have holes present in them 54 which allow the flexible structure assembly to be tethered to the bicycle frame. The back guide posts also have holes 55 present in them, allowing them to be tethered to the bicycle frame. The strip of metal 56 connects top sliding surface 57 to the flexible structure 50 bottom sliding surface. An optical sensor subassembly for measuring chain speed is shown with photodetector 59 and light emitting diode (LED) 60 mounted in a holder 61 which keeps the photodetector 59 and LED 60 well aligned.

Figure 2:
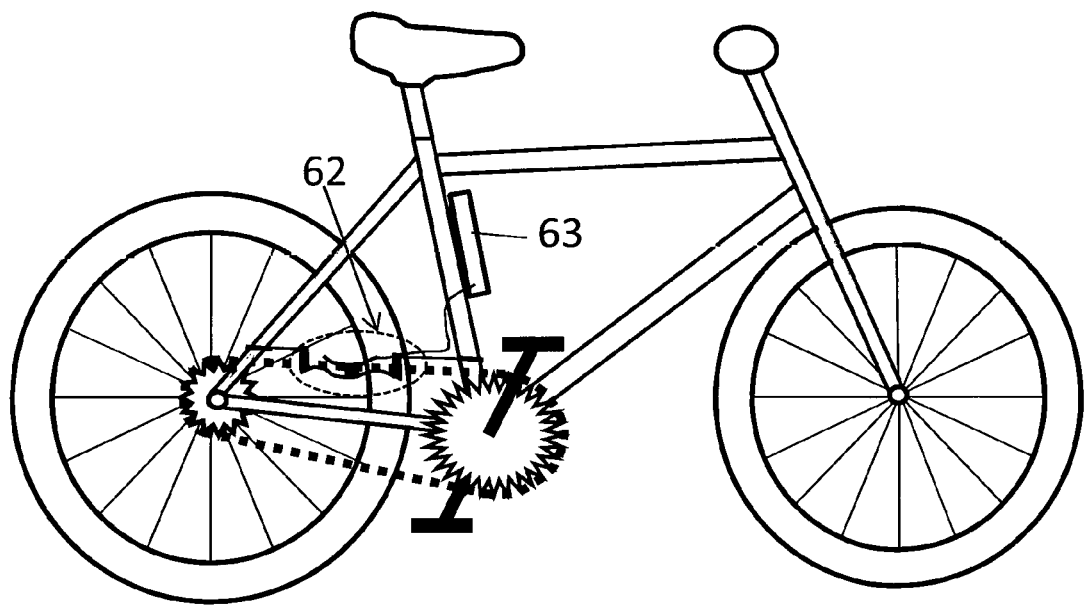
FIG. 2 is a side view of a bicycle showing the location of the self-limiting flexible structure assembly installed on the chain of a bicycle in accordance with the invention and attached to the frame with two tethering wire attachment lines.

FIG. 2 shows the side view of an example bicycle with the power measurement apparatus installed. The flexible structure assembly 62 is shown in the location on the top path of the bicycle chain. This is the segment of the chain that experiences tension while a rider is pedaling. The sensors within the flexible structure assembly are connected electrically to the enclosure box 63 for the microcontroller which can be mounted in any of various convenient locations on the bicycle frame.

First Embodiment

Figure 3:
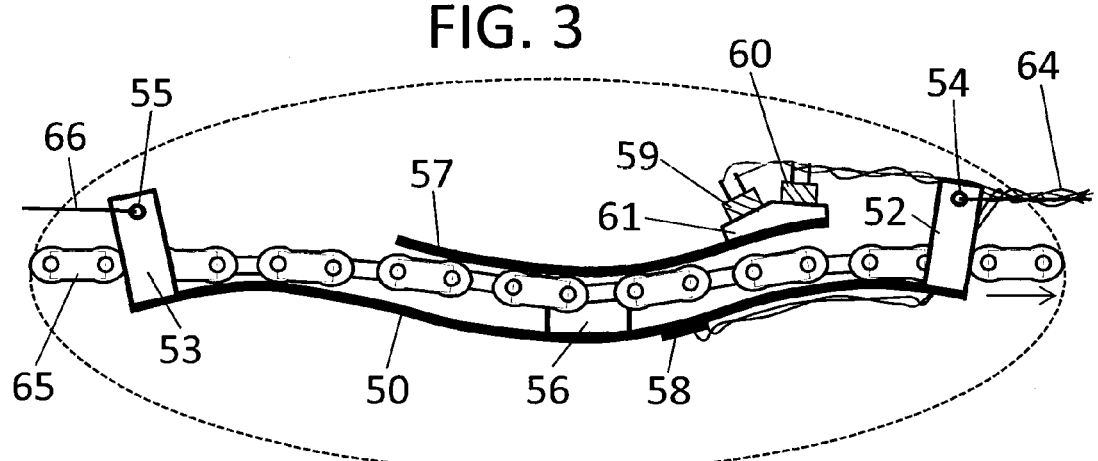
FIG. 3 is a zoomed-in side view of the self-limiting flexible structure assembly previously shown in FIG. 2.

Details of the first embodiment of the flexible structure assembly installed on the chain are more clearly shown in FIG. 3. FIG. 3 is a zoomed-in side view of the flexible structure assembly. As in FIG. 2, the right part of FIG. 3 is toward the front of the bicycle and the left part of FIG. 3 is toward the back side of the bicycle. The bicycle chain 65 slides against the curved base surface of the flexible structure 50. While the rider is pedaling forward, the chain 65 moves forward relative to the flexible structure assembly as shown by the arrow. The flexible structure is made of heat treated alloyed or stainless steel such that it is highly elastic and should not have plastic strain occurring below 0.2% mechanical strain.

The flexible structure 50 curved surface is intended to be contoured as shown in FIG. 3 and is created by metal press. The chain 65, when loose, does not apply significant vertical components of force on the flexible structure 50. However, when force is exerted on the bicycle pedals, the chain 65 will be under tension. The chain tension will lead to an upward force on the top curved sliding surface 57 of the flexible structure assembly and simultaneously lead to a downward force on the two bottom curved sliding surfaces of the flexible structure 50. The forces on the flexible structure assembly are presented at the three regions where the chain 65 contacts the smooth curved surfaces of the flexible structure. The three forces result in a net bending upward displacement of the middle of the flexible structure 50.

The three surfaces are made from a single, integral piece of metal which is from a sheet of metal that is bent in the shape shown. Thus, the vertical support strip 56 rather rigidly holds the lower surface of the flexible structure 50 to the upper surface of the flexible structure 57. The distance between the position of chain contact on the central (top) sliding surface and the position of chain contact on the front sliding surface should be an odd multiple of quarter inches. The same is true for the distance between the position of chain contact on the central (top) sliding surface and the position of chain contact on the rear sliding surface. This condition will help to minimize the polygon effect since it minimizes the variation in chain path length as the chain slides across the flexible structure surfaces 50 and 57. The polygon effect is also further reduced by using larger radii of curvature. It is necessary for the curved surfaces to have radii of curvature of over 2 cm. The radii are preferably more like 8 cm.

Also, the single, integral piece of metal has two side posts at front 52 (seen at right side of FIG. 3) and two side posts at back 53 (left side of FIG. 3). The side posts are on each side of the chain 65 and serve as a guide or alignment of the assembly on the chain. There are holes 55 present in the back side posts 53 which allow the flexible structure assembly to be tethered by a back wire 66. The front guide posts 52 also have holes 54 and are tethered by a front wire 64 to the bicycle frame or front derailleur. The front wire 64 can also serve as a guiding path for the electrical connection between the flexible structure assembly 62 and the microcontroller enclosure 63.

When bending of the flexible structure assembly occurs, a strain gauge 58 on the lower side of the bottom surface of the flexible structure assembly senses the amount of bending. This produces a change in resistance which is sent to the microcontroller enclosure where it is amplified and sent to the microcontroller and used (along with chain speed) in the computation of power generated by the rider.

The speed of chain movement is sensed by the optical subassembly on the upper side of the flexible structure assembly. The optical subassembly comprises a holder 61 for the photodetector 59 and light emitting diode (LED) 60. The holder 61 is attached to the upper surface of the upper side of the flexible structure and serves to keep the alignment of the optical components. The LED 60 produces (visible or infrared) light which will bounce off the rollers of the chain 65. The chain will modulate this light, reflecting a portion back to the photodetector 59 which is aligned to receive light reflected off of the chain 65. When the chain is moving, a periodic current will be sent to the microcontroller enclosure 63. Since the standard chain rollers are 1.27 cm (0.5 inches) in period, the rate of this periodic current will allow the microcontroller to calculate how fast the chain is currently moving. The product of chain tension multiplied by chain speed is the power currently being provided to the chain.

Figure 4:
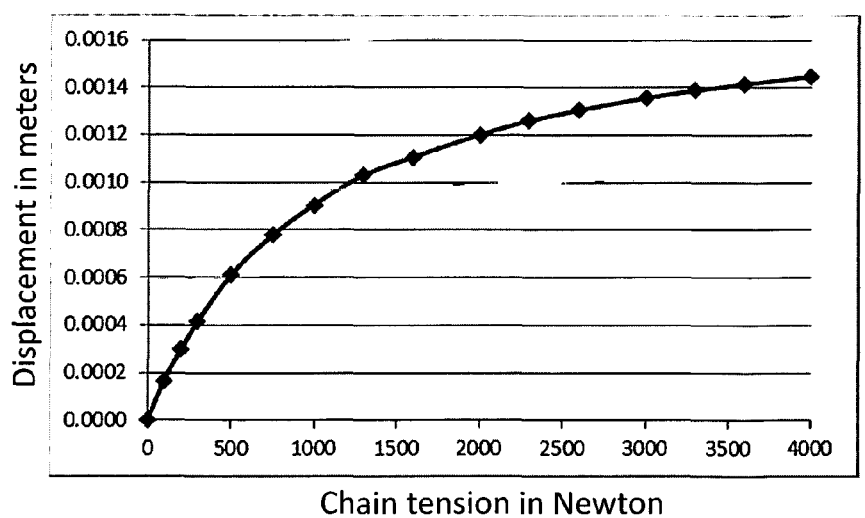
FIG. 4 is a plot of the amount of bending (in meters) of the flexible structure is shown on the y-axis vs. the tension (in Newton) of chain tension on the horizontal x-axis.

A few parameters need to be controlled rather tightly. One parameter is the thickness of the metal used to make the flexible structure assembly. This sheet of metal can be 16 gauge steel (0.062" thickness with tolerance of +/−0.01"). The width of the flexible structure surfaces is 0.95 cm (3/8"). It is useful to make the structure from steel such as 4130 alloy steel or T-304 stainless steel. The distance between the two contact points on the lower surface is approximately 8.9 cm (3.5"). Young's modulus of the steel is approximately 200 GPa. The structure is designed to place an initial (unstrained) vertical bend in the chain of 1.8 mm. Once the chain is strained this vertical bend in the chain will be reduced. A graph of the vertical displacement of the flexible structure (in meters) is shown in FIG. 4 on the vertical axis vs. the chain tension in Newton (Nt.) on the horizontal axis of the plot.

The plot indicates that the amount of bending saturates to an asymptote at higher chain tension. The strain on the flexible structure is self-limiting. In accordance with the design, the chain cannot take the structure to a stress that will induce plastic strain. In order to determine the chain tension from the strain gauge on the flexible structure, the microcontroller is pre-programmed with the inverse of this saturating function. This is done through digital calculation. Simulation, in this case, shows that a bending of 0.36 mm of the flexible structure corresponds to a chain tension 300 Nt. and a bending of 1.43 mm of the flexible structure corresponds to a chain tension of 4000 Nt. An initial calibration can be carried out to make sure zero chain strain corresponds to a signal from the Wheatstone bridge and amplifier circuit relative to the reference voltage. The power present at the chain at any given time is given by Power=(Calculated chain tension)×(Calculated rate of chain movement).

The power is calculated within the microcontroller. The microcontroller can store this power data along with time for later processing. The microcontroller can electrically transmit this information directly to a mobile phone where it can be displayed to the rider. The microcontroller can have stored audio sounds of the numbers 0-9 and other words such as Watts, Joules, etc. and can be sent directly to the rider's ear(s) through ear bud(s). Or the rider could select even less distracting feedback from a tactile actuator that pulse finger 1 or finger 2 in order to indicate if the rider is above or below a target energy or power level.

There will be some drag force as the chain slides against the flexible structure assembly, but the drag force is limited because the vertical force on the flexible structure assembly is limited. Due to its shape, the flexible structure assembly 62 can be clipped directly on the bicycle chain without even opening the chain.

Second Embodiment

A second embodiment is shown in FIG. 1. FIG. 1 is similar in configuration to the first embodiment, except that the second embodiment has an accelerometer 51 mounted on the connecting strip of metal 56 instead of having a strain gauge mounted on the flexible structure. Since the flexible structure is always directly in contact with the chain 65, the vertical displacement of the accelerometer 51 matches the vertical displacement of the chain 65 when the chain has tension in it. Therefore, the accelerometer always senses the vibrational movement and resonance of the chain. This vibrational resonance frequency is directly related to the tension in the chain. Thus, the output of the accelerometer such as an Analog Devices ADXL337 can be used to determine the tension within the top path of the chain.

This second embodiment is less dependent on the metal thickness or initial bending angle than the first embodiment. So, less strict tolerances can be placed on the flexible structure parameters (thickness, width, initial bending angle, heat treatment, etc.) than in the first embodiment. Also, it is possible to use thinner metal in this embodiment and thus to reduce the frictional drag on the chain 65. The metal however cannot be so flexible that the direct contact between the metal and chain at the 3 points lose direct contact. The data from the accelerometer can be periodically sampled. Various signal processing steps can be taken: the sequence of data can be apodized, the direct current (DC) component of the data can be removed, a fast Fourier transform is performed on the sequence of data, smoothing and filtering is useful, and peak detection is used to determine the fundamental vibrational resonance frequency of the chain. The accelerometer of the second embodiment can be used in combination with the strain gauge of the first embodiment to provide an even more versatile power measurement apparatus than either alone.

Third Embodiment

Figure 5:
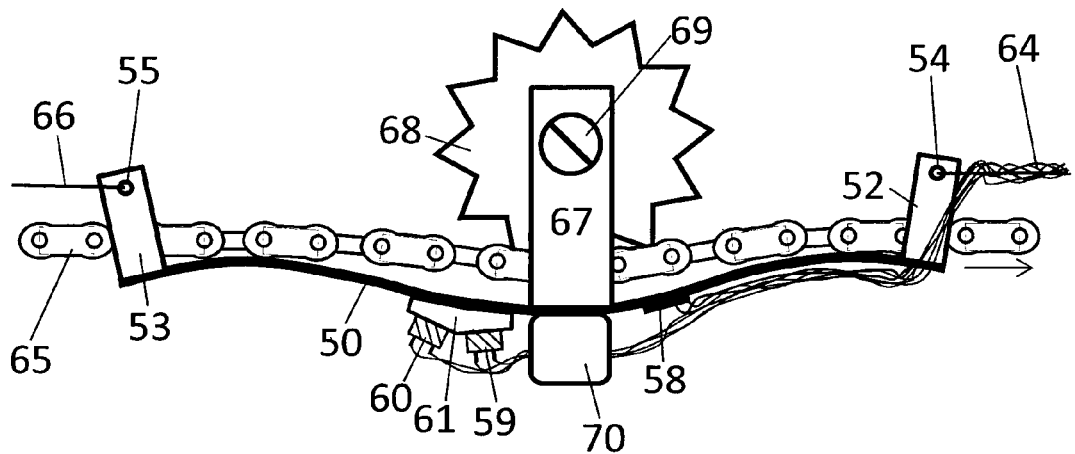
FIG. 5 is a zoomed-in side view of a third embodiment of the self-limiting flexible structure assembly which is based on two smooth sliding surfaces and one sprocket.

A third embodiment is shown in FIG. 5. FIG. 5 is based on the same principle as the first embodiment. It has front alignment posts 52 with a pair of holes 54 in them, back alignment posts 53 with a corresponding pair of holes 55. The flexible assembly has tether lines 64 and 66. However, this third embodiment has a rather large sprocket 68 in place of the upper sliding surface. The sprocket is greater than 2 cm in radius to avoid excessive power dissipation and noise due to the polygon effect. The sprocket 68 is attached to the integral flexible structure 50 through two side support posts 67 (one on each side of the sprocket) and attached by a bolt 69 and nut through the sprocket. This structure also does not require the chain 65 to be opened for installation since the sprocket 68 is easily removed and replaced using the bolt 69.

There are no additional sprockets beneath the chain because large sprockets in that location would severely limit the fraction of bicycles that would operate well with the flexible structure assembly installed. The optical sensor assembly with photodetector 59, LED 60, and holder 61 for measuring chain speed are placed underneath the flexible structure 50 in this third embodiment. There is an optional spacer 70 attached below the flexible structure to provide protection for the components beneath the flexible structure 50.

Fourth Embodiment

Figure 6:
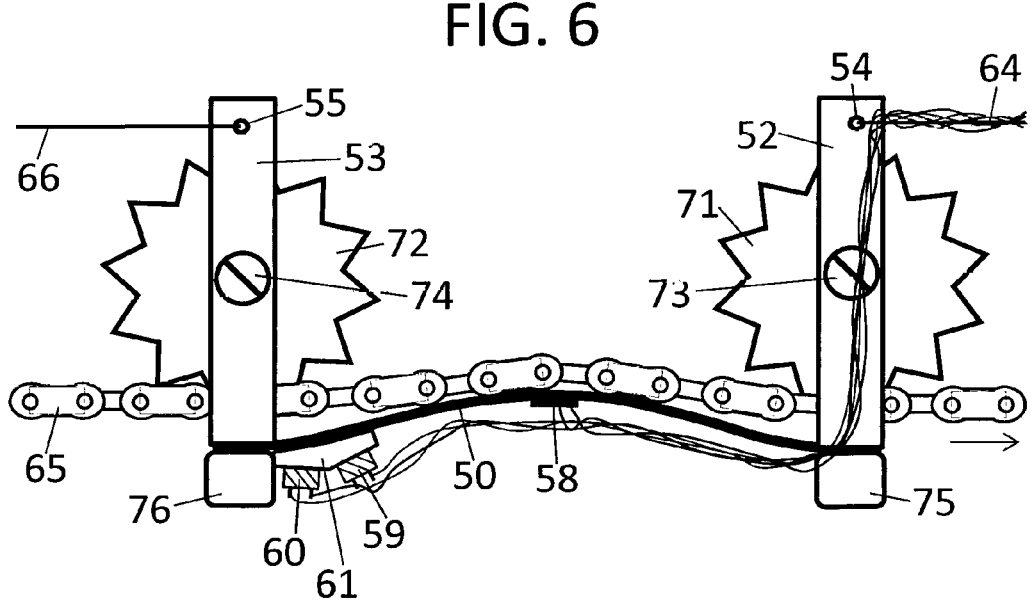
FIG. 6 is a zoomed-in side view of a fourth embodiment of the self-limiting flexible structure assembly which is based on one smooth sliding surface and two sprockets.

A fourth embodiment is shown in FIG. 6. FIG. 6 is based on the same principle as the first embodiment but has two rather large sprockets: a front sprocket 71 and a rear sprocket 72. The sprockets are greater than 2 cm in radius to avoid excessive power dissipation and noise due to the polygon effect. The sprockets are attached to the integral flexible structure 50 through two sets of side support posts: 52 at the front and 53 at the back. The front sprocket 71 is attached by a bolt 73 and nut through the sprocket. The rear sprocket 72 is attached by another bolt 74 and nut through the sprocket. This structure also does not require the chain to be opened for installation since the sprockets are easily removed and replaced using the bolts 73 and 74.

There are no additional sprockets beneath the chain because large sprockets in that location would severely limit the fraction of bicycles that would operate well with the flexible structure assembly installed. The optical sensor assembly with same photodetector 59, LED 60, and holder 61 are placed underneath the flexible structure 50 in this fourth embodiment. There are optional spacers: front spacer 75 and back spacer 76 which are attached below the flexible structure 50 to provide protection of the components beneath the flexible structure 50. The sign of operating strain measured in the third embodiment is opposite those in the earlier embodiments, but that is not of significance, and the sign is easily handled by the microcontroller code.

The invention claimed is:

1. A tension-measuring apparatus comprising:
   a) an elastically flexible structure, surrounding a chain, with said flexible structure possessing at least one curved surface that is contiguous and slidable against said chain,
   b) at least 3 contact regions or points along said flexible structure's length with said chain, where tension in said chain will cause the flexible structure to bend measurably, and that act of bending will provide a self-limiting force, preventing further bending of said flexible structure and preventing drag on said chain's movement against said flexible structure from growing linearly (or faster) versus chain tension, and
   c) at least one sensor affixed to said flexible structure, whereby, said flexible structure will provide a measurement of tension within said chain.

2. The apparatus in 1, wherein said curved surface which slides against said chain has radius of curvature no less than 2 cm.

3. The apparatus in 2, wherein said flexible structure is affixed and slidable on said chain without requiring said chain to be opened.

4. The apparatus in 1, further comprising a tether line to hold a constant longitudinal position relative to the main structure while allowing said chain to predominantly determine the lateral and vertical position of said flexible structure.

5. The apparatus in 2, wherein a strain gauge is used to sense said strain on said flexible structure.

6. The apparatus in 2, wherein an accelerometer is affixed to said flexible structure, whereby the vibrational frequency of said chain can be used to determine tension with said chain.

7. The apparatus in 2, wherein a microcontroller receives input from one or more sensors providing a means for audio reports based on power performance.

8. The apparatus in 2, wherein said microcontroller drives a tactile actuator, providing feedback to an operator such as indicating if a bicycle rider is above or below a target.

9. The apparatus in 2, further comprising a means to connect directly to a mobile phone running an app, wherein the power measurement apparatus needs no specific LCD display monitor hardware other than said mobile phone.

10. The apparatus in 9, wherein said app accesses a database of prior rides and provides target power levels for a specific route based on prior results.

11. An apparatus on a chain-driven vehicle which transmits power from a first sprocket to a second sprocket, wherein a chain remains in contact with and slides along a flexible structure which has at least one smooth, curved surface, and said apparatus comprises a sensor to measure the force on said chain and further comprises a sensor to measure the speed of the chain and computes the power based on the product of these two parameters.

12. The apparatus in 11, further comprising a means for directly connecting the apparatus output to a mobile phone and needs no LCD display monitor hardware other than said mobile phone.

13. The apparatus in 12, further comprising a means for displaying advertisements through visual display or auditory transducer.

14. Method for measuring tension within a chain comprising:
   a. providing a chain,
   b. attaching a flexible structure which surrounds said chain and slides along said chain,
   c. aligning said flexible structure such that said flexible structure contacts said chain in at least 3 distinct contact points or regions along the length of said flexible structure,
   d. shaping flexible structure such that when it bends slightly (less than 20 degrees in angle), the force on said flexible structure is not significantly increased because said flexible structure is subject to a self-limiting force such that further tension in said chain will not significantly further bend said flexible structure,
   e. permitting drag force of said flexible structure against said chain to rise sub-linearly with tension in said chain, and
   f. sensing the condition of said flexible structure.

15. Method in 14, wherein the means of said sensing comprises a strain gauge affixed to said flexible structure.

16. Method in 14, wherein said sensing comprises an accelerometer affixed to said flexible structure, wherein said accelerometer is contiguous to said chain.

17. Method in 14, wherein speed of said chain is also measured and the product of said force and said speed is used to determine the power or energy expended.

18. Method in 17, wherein said flexible structure comprises at least one smooth, curved surface which slides against said chain wherein the radius (or radii) of the curved surface(s) is (are) greater than 2 cm.

19. Method in 18, wherein said curved surface has a low coefficient of friction which is less than 0.5 against said chain.

20. Method in 18, wherein the self-limiting bending force on said flexible structure imposed by said chain can be no larger than 400 Nt.

\* \* \* \* \*